(12) United States Patent
Park et al.

(10) Patent No.: US 9,713,150 B2
(45) Date of Patent: Jul. 18, 2017

(54) METHOD AND DEVICE FOR COMPONENT CARRIER MANAGEMENT IN A WIRELESS COMMUNICATION SYSTEM

(71) Applicant: LG ELECTRONICS INC., Seoul (KR)

(72) Inventors: Sung Jun Park, Gyeongki-do (KR); Sung Duck Chun, Gyeongki-do (KR); Sung Hoon Jung, Gyeongki-do (KR); Seung June Yi, Gyeongki-do (KR); Young Dae Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 73 days.

(21) Appl. No.: 14/589,559

(22) Filed: Jan. 5, 2015

(65) Prior Publication Data

US 2015/0139059 A1 May 21, 2015

Related U.S. Application Data

(62) Division of application No. 13/520,212, filed as application No. PCT/KR2011/000112 on Jan. 7, 2011, now abandoned.

(Continued)

(30) Foreign Application Priority Data

Jan. 6, 2011 (KR) ........................ 10-2011-0001382

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0098* (2013.01); *H04W 24/10* (2013.01);
(Continued)

(58) Field of Classification Search
CPC ......................... H04L 5/0098; H04W 72/0453
See application file for complete search history.

(56) References Cited

U.S. PATENT DOCUMENTS

| 2005/0031047 | A1 | 2/2005 | Maltsev et al. |
| 2009/0092091 | A1* | 4/2009 | Balasubramanian . H04L 5/0064 370/329 |

(Continued)

FOREIGN PATENT DOCUMENTS

| WO | 2009-120125 A1 | 1/2009 |
| WO | 2009/117944 A1 | 10/2009 |

OTHER PUBLICATIONS

International Search Report issued in PCT/KR2011/000112 dated Sep. 30, 2011.

(Continued)

*Primary Examiner* — Benjamin Lamont
(74) *Attorney, Agent, or Firm* — Morgan, Lewis & Bockius LLP

(57) ABSTRACT

Provided are a method and device in which a terminal manages component carriers in a wireless communication system. The terminal receives activation pattern data indicating activation or inactivation of at least one serving cell from a base station, and activates or inactivates the at least one component carrier in accordance with the activation pattern data.

3 Claims, 10 Drawing Sheets

Related U.S. Application Data

(60) Provisional application No. 61/293,185, filed on Jan. 7, 2010.

(51) Int. Cl.
  *H04W 24/10* (2009.01)
  *H04W 52/02* (2009.01)
  *H04W 36/18* (2009.01)

(52) U.S. Cl.
  CPC ........ *H04W 52/0212* (2013.01); *H04W 36/18* (2013.01); *Y02B 60/50* (2013.01)

(56) References Cited

U.S. PATENT DOCUMENTS

| | | |
|---|---|---|
| 2009/0196196 A1 | 8/2009 | Ghosh et al. |
| 2009/0257387 A1 | 10/2009 | Gholmieh et al. |
| 2009/0316575 A1 | 12/2009 | Gholmieh et al. |
| 2010/0118720 A1* | 5/2010 | Gauvreau ........... H04W 72/048 370/252 |
| 2010/0130137 A1 | 5/2010 | Pelletier et al. |
| 2010/0130219 A1 | 5/2010 | Cave et al. |
| 2011/0026422 A1* | 2/2011 | Ma .................... H04W 72/0453 370/252 |
| 2011/0142009 A1* | 6/2011 | Lindoff ................. H04L 5/0053 370/332 |
| 2012/0113811 A1* | 5/2012 | Bao ......................... H04L 5/001 370/241 |
| 2013/0010611 A1* | 1/2013 | Wiemann .............. H04L 1/1867 370/242 |

OTHER PUBLICATIONS

Korean Office Action dated Nov. 18, 2016, for the corresponding Korean Patent Application No. 10-2011-0001382.

* cited by examiner

METHOD AND DEVICE FOR COMPONENT CARRIER MANAGEMENT IN A WIRELESS COMMUNICATION SYSTEM

CROSS REFERENCE TO RELATED APPLICATIONS

The present application is a divisional of U.S. patent application Ser. No. 13/520,212, filed on Jul. 2, 2012, the entire disclosure of which is hereby incorporated by reference for all purposes as if fully set forth herein. U.S. patent application Ser. No. 13/520,212 is a National Stage entry of PCT International Application No. PCT/KR2011/000112, filed on Jan. 7, 2011, which claims the benefit of Korean Patent Application No. 10-2011-0001382, filed on Jan. 6, 2011, and U.S. Provisional Application No. 61/293,185, filed on Jan. 7, 2010.

TECHNICAL FIELD

The present invention relates to wireless communications, and more particularly, to a method and apparatus for managing a component carrier in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The 3GPP LTE-A employs various techniques such as carrier aggregation, relay, etc. The 3GPP LTE system is a single carrier system supporting only one bandwidth (i.e., one component carrier) among {1.4, 3, 5, 10, 15, 20}MHz. On the other hand, the LTE-A employs multiple carriers using carrier aggregation. The component carrier is defined with a center frequency and a bandwidth.

The component carrier may correspond to one cell. A multiple carrier system uses a plurality of component carriers having a narrower bandwidth than a full bandwidth.

With the introduction of the multiple carrier system, the user equipment (UE) can receive a service from a plurality of cells. However, battery consumption of the UE may increase to maintain a connection with the plurality of cells.

It is not always necessary for the UE to receive the service from a fixed number of cells. Accordingly, there is a need to dynamically activate or inactivate a cell in order to reduce the battery consumption of the UE.

DISCLOSURE

Technical Problem

The present invention provides a method and apparatus for managing a component carrier for activation or inactivation of a serving cell.

Technical Solution

In an aspect, a method of managing a component carrier by a user equipment in a wireless communication system is provided. The method includes receiving activation pattern information indicating activation or inactivation of at least one serving cell from a base station, and activating or inactivating the at least one component carrier according to the activation pattern information.

The activation pattern information may include an activation pattern indicating activation or inactivation of the at least one component carrier on a subframe basis.

The activation pattern information may include an identifier indicating the component carrier to be activated or inactivated.

The at least component carrier may correspond to one cell, and the component carrier to be activated or inactivated may correspond to a cell to be activated or inactivated.

In another aspect, a method of managing a component carrier by a user equipment in a wireless communication system. The method includes activating at least one component carrier, and inactivating the at least one activated component carrier according to a specific condition, wherein the specific condition is used when the user equipment autonomously determines inactivation of the at least one component carrier.

The specific condition may include at least one of channel quality, a buffer statue of the user equipment, a power headroom status of the user equipment, and a number of scheduling request transmission.

Advantageous Effects

A signaling overhead for activating or inactivating a plurality of component carriers (or serving cells) can be decreased. A data loss can be avoided, and battery consumption of a user equipment can be decreased.

MODE FOR INVENTION

Figure 1:
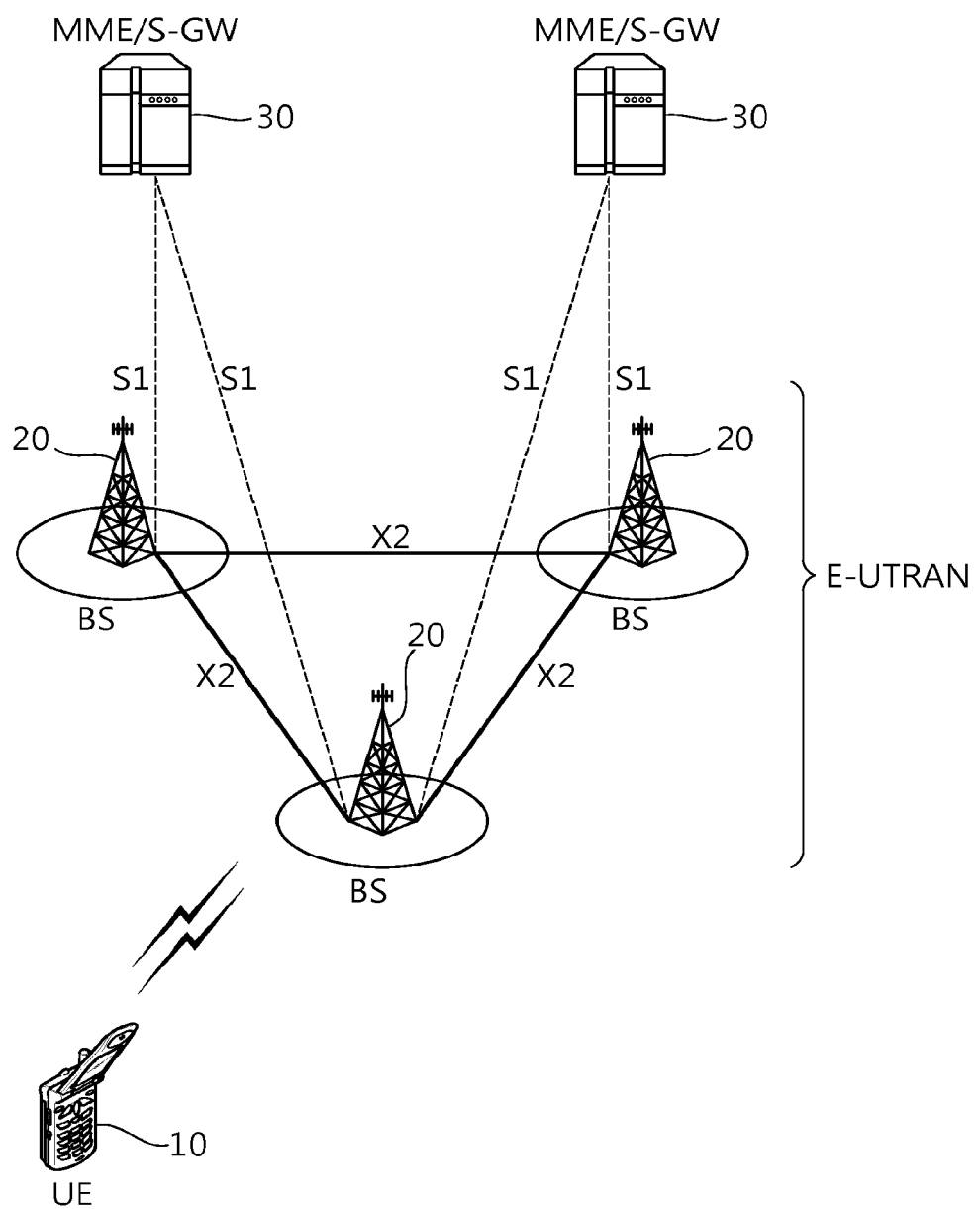
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
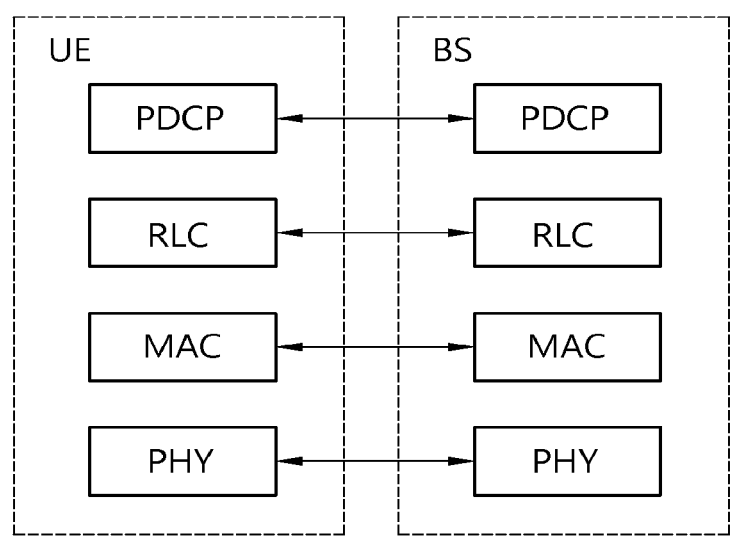
FIG. 2 is a diagram illustrating a radio protocol architecture for a user plane.
Figure 3:
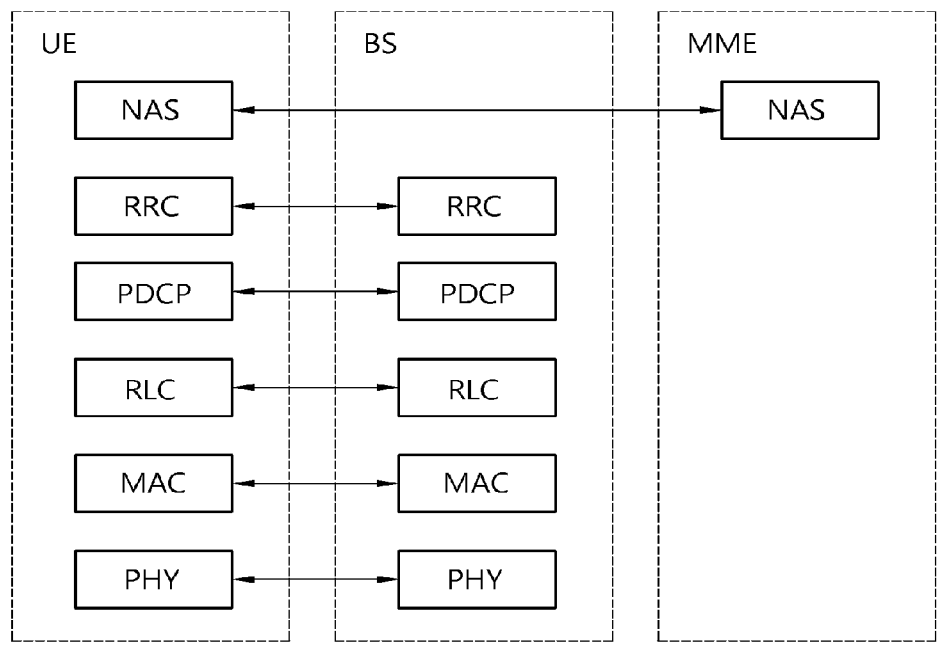
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Now, a multiple carrier system will be described.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
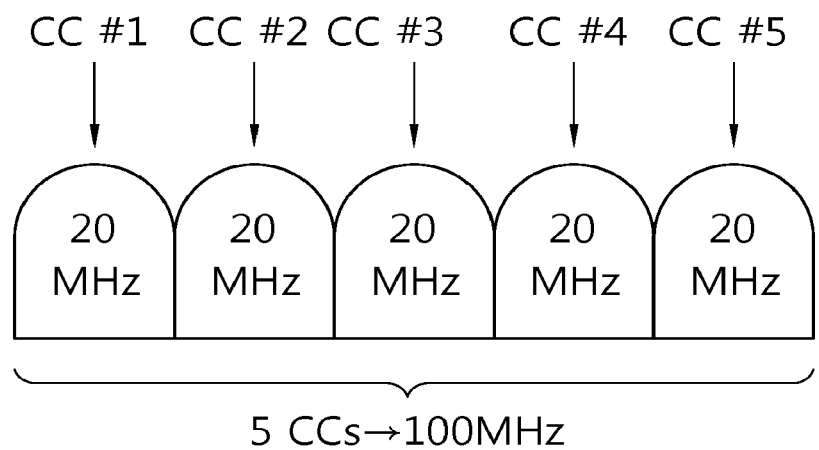
FIG. 4 shows an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 5:
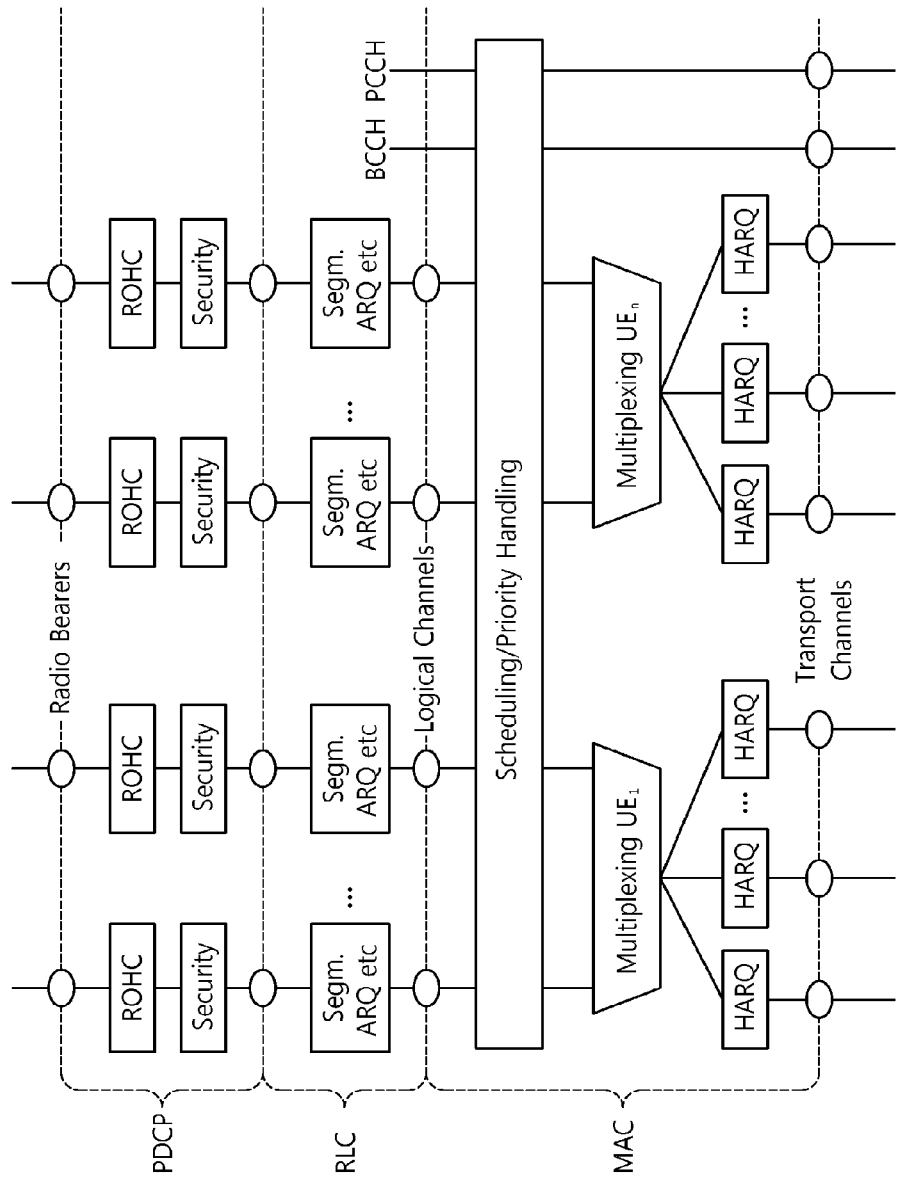
FIG. 5 shows a second-layer structure of a base station for multiple carriers.
Figure 6:
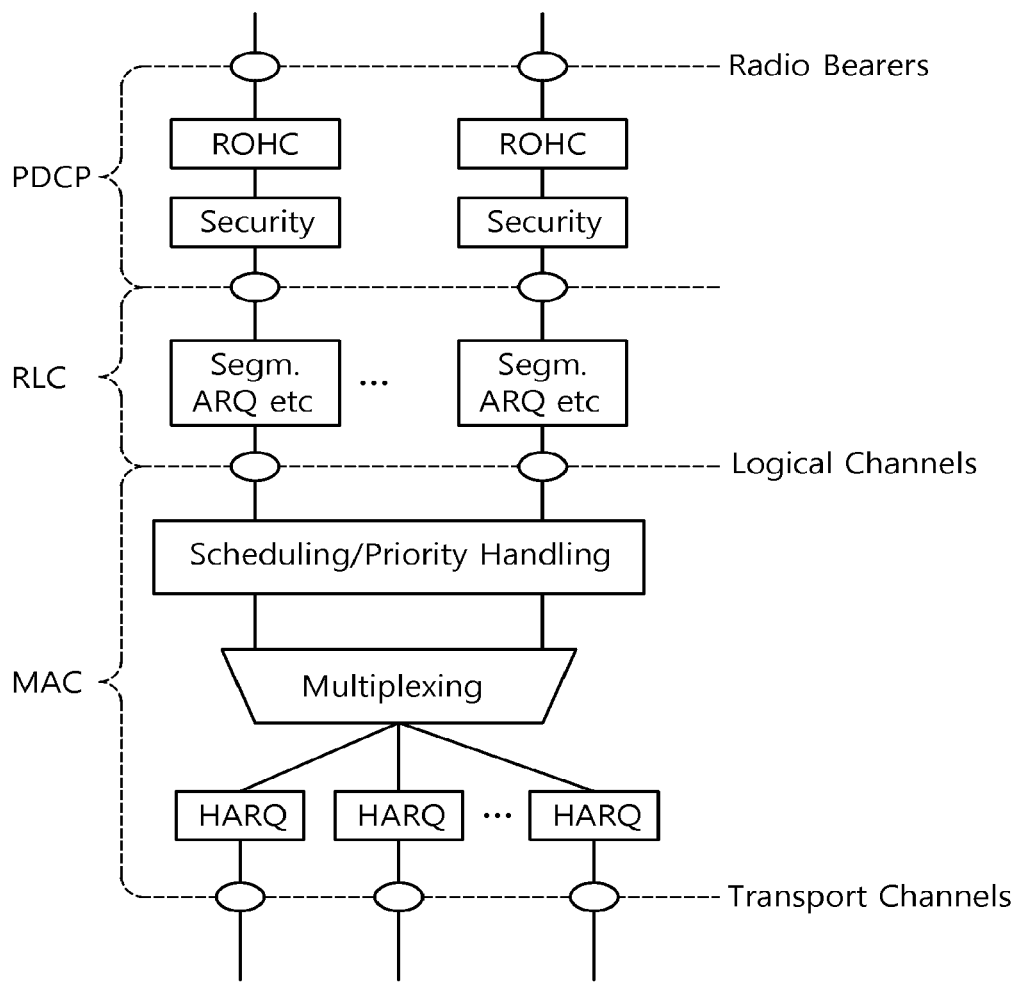
FIG. 6 shows a second-layer structure of a user equipment for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

The BS can provide the plurality of serving cells to the UE by using the plurality of downlink CCs. Accordingly, the UE and the BS can communicate with each other by using the plurality of serving cells.

According to wireless channel quality and a traffic property of a service used by the UE, all assigned serving cells may not be used when the BS communicates with the UE. Apart from actual communication with the BS, if the UE monitors a control channel for all serving cells and measures the wireless channel quality, the UE consumes its battery as a result.

The BS may activate only a serving cell actually used among a plurality of assigned serving cells, and may inactivate an unused serving cell. The UE does not require monitoring of the control channel and measuring of wireless quality with respect to the inactive serving cell.

If the BS frequently activates or inactivates a serving cell according to the quality of the wireless channel and the property of the service used by the UE, a control signal for the activation and inactivation needs to be transmitted frequently. Therefore, there is a need for a method capable of decreasing a signaling overhead caused by activation/inactivation of the serving cell.

The BS may provide the UE with one or more serving cells to be used by the UE.

The serving cells provided to the UE may be classified into a primary serving cell and a secondary serving cell. The primary serving cell is a cell to which the UE initially accesses and is a cell to which primary control information is delivered. The primary serving cell may also be referred to as a main serving cell. The primary serving cell may not be inactivated, and only the secondary serving cell may be inactivated.

The inactive serving cell has the following properties.

(1) The UE does not perform monitoring of a PDCCH related to the inactive serving cell.

(2) The UE does not perform reception and processing of an uplink grant (or uplink resource allocation) and downlink grant (or downlink resource allocation) used in the inactive serving cell.

(3) The UE does not perform uplink transmission on an uplink channel of the inactive serving cell.

(4) The UE does not report a channel quality indicator (CQI)/precoding matrix indicator (PMI)/rank indicator (RI) and a sounding reference signal (SRS) related to the inactive serving cell.

The active serving cell has the following properties.

(1) The UE performs monitoring of a PDCCH related to the active serving cell.

(2) The UE performs reception and processing of an uplink grant (or uplink resource allocation) and downlink grant (or downlink resource allocation) used in the active serving cell.

(3) The UE performs uplink transmission on an uplink channel of the active serving cell.

(4) The UE reports a CQI/PMI/RI and an SRS related to the active serving cell.

First, a method is proposed in which activation pattern information related to activation and inactivation of serving cells assigned to a UE is transmitted by a BS to the UE, and a serving cell is activated or inactivated according to the received activation pattern information.

The activation pattern information may be reported by the BS to the UE by using system information, an RRC message, a MAC message and/or a physical downlink control channel (PDCCH) message.

The activation pattern information may be configured on a subframe basis. The activation pattern information may be indicated to activate or inactivate serving cells for each subframe. As well known, a radio frame of 3GPP LTE includes 10 subframes in a unit of 10 ms. If a bitmap "0001100000" is provided as the activation pattern information, the UE activates a serving cell in 4th and 5th subframes which are set to a bit '1' with a period of 10 ms, and inactivates the serving cell in the remaining subframes which are set to a bit '0'. The UE activates one or more serving cells in the 4th and 5th subframes by using the activation pattern information configured on the subframe basis, and inactivates one or more serving cells in other subframes except for the 4th and 5th subframes.

The activation pattern information may include a serving cell identifier. The serving cell identifier indicates a serving cell activated or inactivated among a plurality of serving cells. The serving cell identifier may be expressed by each serving cell's cell ID, cell index, and/or frequency information. For example, if the BS transmits activation pattern information including a serving cell identifier 'X' to the UE, the UE activates or inactivates a serving cell according to a subframe included in the activation pattern information and indicated by the serving cell identifier among the assigned serving cells.

Figure 7:
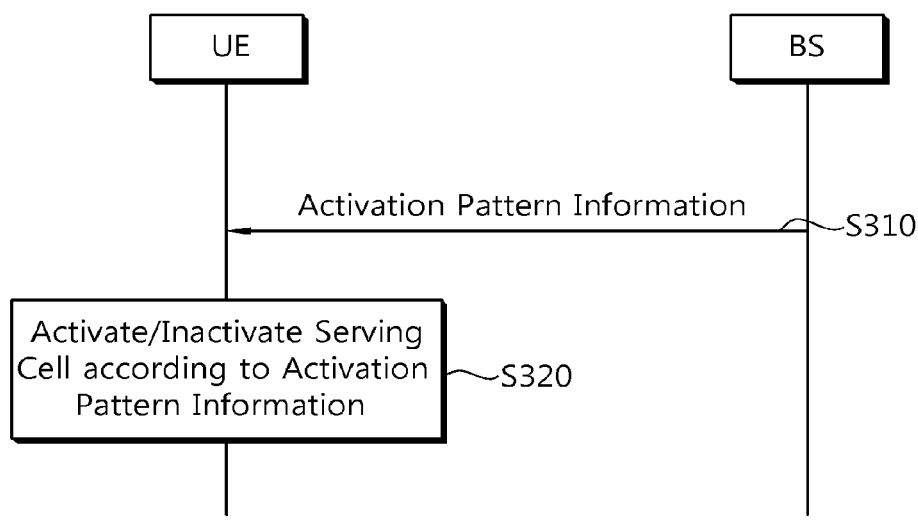
FIG. 7 is a flowchart showing a method of managing a serving cell according to an embodiment of the present invention.

FIG. 7 is a flowchart showing a method of managing a serving cell according to an embodiment of the present invention.

A UE receives activation pattern information for activation or inactivation of the serving cell from a BS (step S310).

The activation pattern information includes a period of an activation pattern, information indicating activation or inactivation of a serving cell on a subframe basis, and a serving cell identifier indicating a serving cell to which the activation pattern is applied. When activation and inactivation of a plurality of serving cells are indicated, the activation pattern information may include activation patterns for the plurality of serving cells.

The UE activates or inactivates one or more serving cells according to the activation pattern information. The UE activates or inactivates serving cells on the subframe basis by using information elements (i.e., an activation pattern period, a subframe to be activated, and a serving cell identifier) included in the activation pattern information.

The UE determines which serving cells will be activated or inactivated in every subframe according to the activation pattern information.

Figure 8:
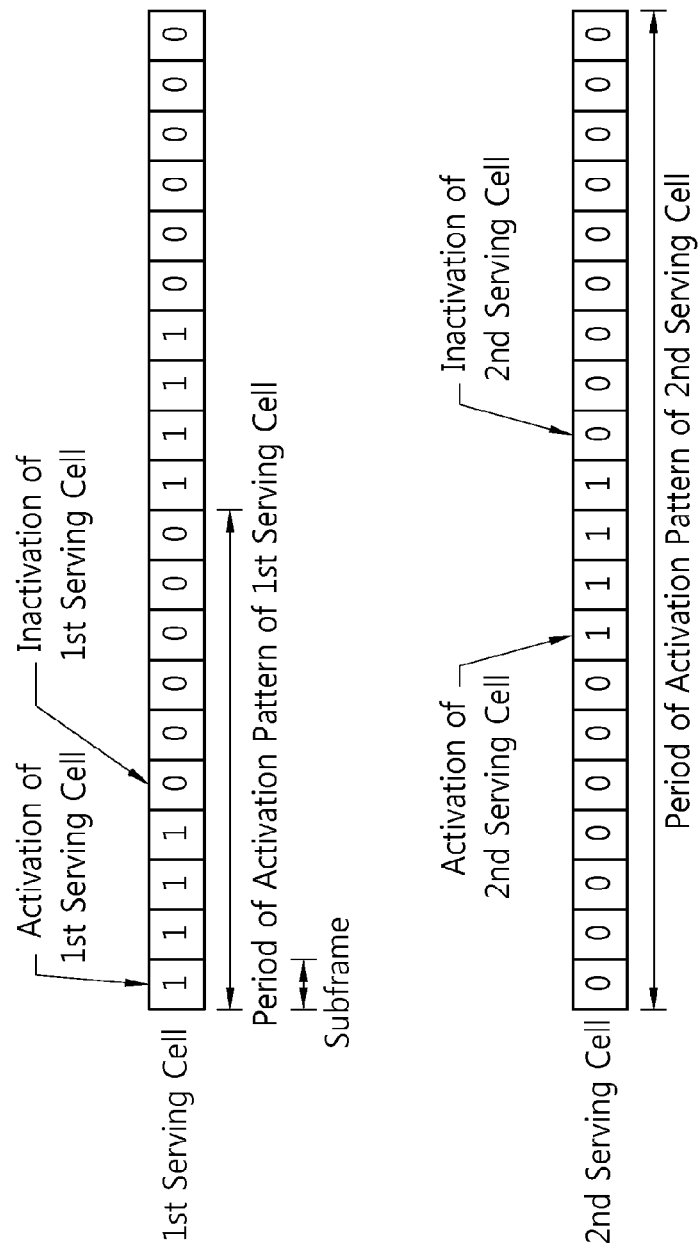
FIG. 8 shows an example of activation pattern information.

FIG. 8 shows an example of activation pattern information.

There are 1st and 2nd serving cells. It is assumed that an activation pattern of the 1st serving cell is a bitmap "1111000000", and an activation pattern of the 2nd serving cell is a bitmap "00000001111000000000". Each bit constituting the bitmap corresponds to one subframe. A size of the bitmap is called an activation pattern. If a length of one subframe 1 ms, the activation pattern of the 1st serving cell has a period of 10 ms, and the activation pattern of the 2nd serving cell has a period of 20 ms. Although a bit set to '1' implies activation of a serving cell, and a bit set to '0' implies inactivation of the serving cell, this is for exemplary purposes only.

The UE determines whether a serving cell will be activated or inactivated in every subframe according to the activation pattern information.

According to the activation pattern information of FIG. 8, the UE activates the 1st serving cell in first four subframes. Then, the UE activates the 2nd serving cell in 8th to 11th subframes. The 1st serving cell and the 2nd serving cell are inactivated in the remaining subframes.

The BS and the UE may periodically activate or inactivate a plurality of serving cells. Therefore, a signaling overhead for activating or inactivating the plurality of serving cells can be decreased.

Now, a method of autonomously activating or inactivating a serving cell by a UE will be proposed.

The UE may not be able to inactivate a serving cell not used by the UE in a situation where a BS cannot correctly recognize a traffic property of the UE and a wireless channel environment. In this case, the UE consumes its battery due to an unnecessary active serving cell.

Hereinafter, it is proposed that the UE autonomously determines an activation condition and inactivates a serving cell assigned to the UE.

When the UE satisfies the activation condition, the UE can inactivate only a secondary serving cell.

When the UE inactivates a serving cell according to the activation condition, the UE may inactivate all serving cells assigned to the UE or may inactivate only serving cells satisfying the activation condition.

If there is a special serving cell used for a special purpose among a plurality of serving cells, the UE may inactivate all remaining serving cells other than the special serving cell according to the activation condition. The special serving cell may be a primary serving cell.

The activation condition may include at least one of quality of a downlink wireless channel, a buffer status of the UE, a power headroom status of the UE, and a transmission count for a scheduling request signal.

When the activation condition is the quality of the downlink wireless channel, the UE inactivates the serving cell as follows. The BS assigns to the UE a threshold related to the quality of the downlink wireless channel. The UE contiguously measures the quality of the downlink wireless channel of the serving cells. If a measurement result of the special serving cell is decreased below the threshold, the UE inactivates the special serving cell. The quality of the downlink wireless channel can be expressed by a well-known indicator such as a CQI, reference signal received power (RSRP), and/or reference signal received quality (RSRQ).

If the quality of the downlink wireless channel is poor, it implies that a transmission error rate of downlink data transmitted on the downlink channel is increased in general. Therefore, data retransmission and loss can be decreased by inactivating a serving cell having a high transmission error rate.

When the activation condition is the transmission count for the scheduling request signal, the UE inactivates the serving cell as follows. The BS assigns to the UE a threshold related to the transmission count for the scheduling request signal. If the transmission count is greater than the threshold, the UE inactivates the assigned serving cell. Alternatively, the UE inactivates the serving cell assigned to the UE when the transmission count for the scheduling request signal reaches the maximum transmission count assigned by the BS for the scheduling request signal. The scheduling request signal may include a random access preamble and/or a signal transmitted on a physical uplink control channel (PUCCH) for requesting uplink resource allocation.

If the quality of the uplink wireless channel is poor, the transmission count for the scheduling request signal is increased in general. This implies that a transmission error rate of uplink data transmitted on the uplink channel is increased. Therefore, data retransmission and loss can be decreased by inactivating a serving cell having a high transmission error rate.

When the activation condition is the buffer status of the UE, the UE inactivates the serving cell as follows. The BS assigns to the UE a threshold related to the buffer status of the UE. The UE evaluates its buffer status. If an amount of data stored in the buffer of the UE is decreased below the threshold, the UE inactivates a serving cell assigned to the UE. Alternatively, the UE inactivates the assigned serving cell when there is no data stored in its buffer. The buffer of the UE may include a buffer of a MAC layer, a buffer of an RLC layer, and/or a buffer of a PDCP layer.

If the amount of data stored in the buffer of the UE can be sufficiently transmitted by using a relatively smaller number of serving cells, some of a plurality of serving cells are inactivated. Therefore, power consumption of the UE can be decreased by inactivating some of excessively assigned serving cells.

When the activation condition is the power headroom status of the UE, the UE inactivates the serving cell as follows. The BS assigns to the UE a threshold related to the power headroom status. If the power headroom status is greater than or equal to the threshold, the UE inactivates the assigned serving cell. Power headroom information of the UE may be used in the measurement of the power headroom status of the UE.

If the UE has a power headroom enough to transmit data to the BS by using a relatively smaller number of serving cells, some of a plurality of serving cells are inactivated. Therefore, power consumption of the UE can be decreased by inactivating some of excessively assigned serving cells.

Figure 9:
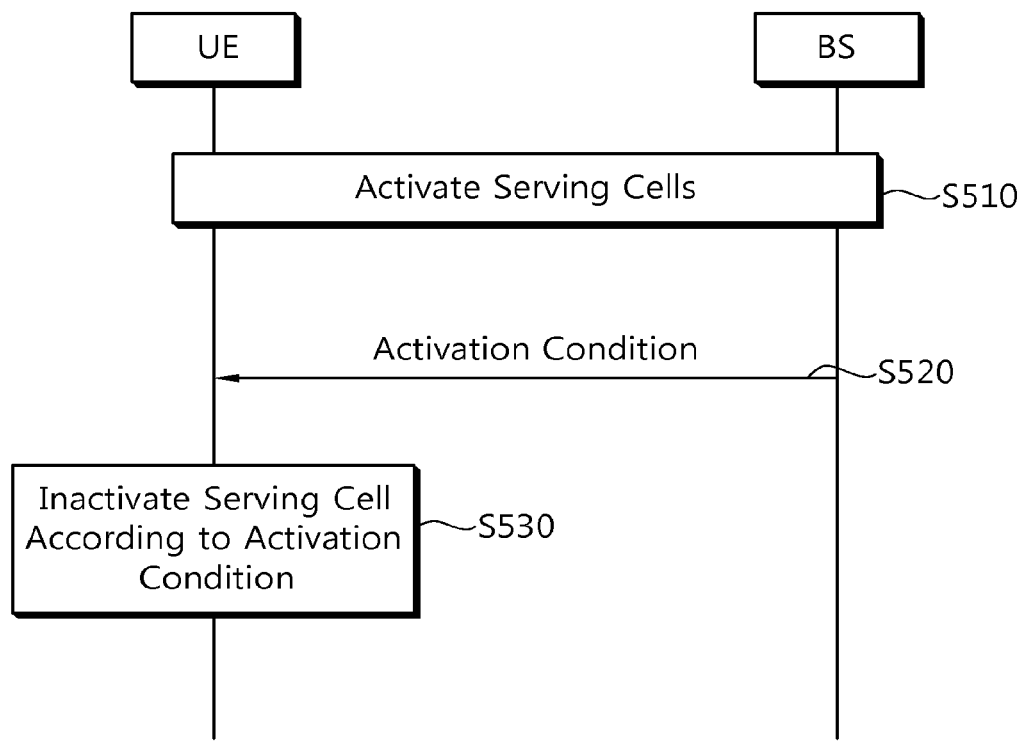
FIG. 9 is a flowchart showing a method of managing a serving cell according to an embodiment of the present invention.

FIG. 9 is a flowchart showing a method of managing a serving cell according to an embodiment of the present invention.

A UE and a BS activate a plurality of serving cells (step S510). One of the plurality of serving cells may be a primary serving cell, and the others may be secondary serving cells.

The UE receives from the BS an activation condition used to determine whether the serving cell is inactive (step S520). The activation condition may include at least one of quality of a downlink radio channel, a buffer status of the UE, a power headroom status of the UE, and a transmission count for a scheduling request signal. The activation condition may be determined autonomously by the UE and may include a parameter for inactivating a serving cell assigned to the UE. The activation condition may include a threshold for at least one of the quality of the downlink wireless channel, the buffer statue of the UE, the power status of the UE, and the transmission count for the scheduling request signal. The activation condition may be transmitted by using system information, an RRC message, a MAC message, and/or a PDCCH message.

However, if the activation condition is pre-defined between the UE and the BS, an operation for receiving the activation condition by the UE may be omitted.

The UE inactivates the assigned serving cell according to the activation condition (step S530). The UE may determine whether the activation condition is satisfied in a unit of a single subframe or a plurality of subframes. If the activation condition is satisfied, the UE inactivates the serving cell. For example, if the activation condition is the quality of the downlink wireless channel, when a measurement result of a specific serving cell is decreased below the threshold, the UE inactivates the specific serving cell.

In a situation where the BS cannot properly inactivate the serving cell assigned to the UE, the UE may autonomously inactivate an unnecessary serving cell. Therefore, data loss can be avoided, and battery consumption of the UE can be decreased.

Figure 10:
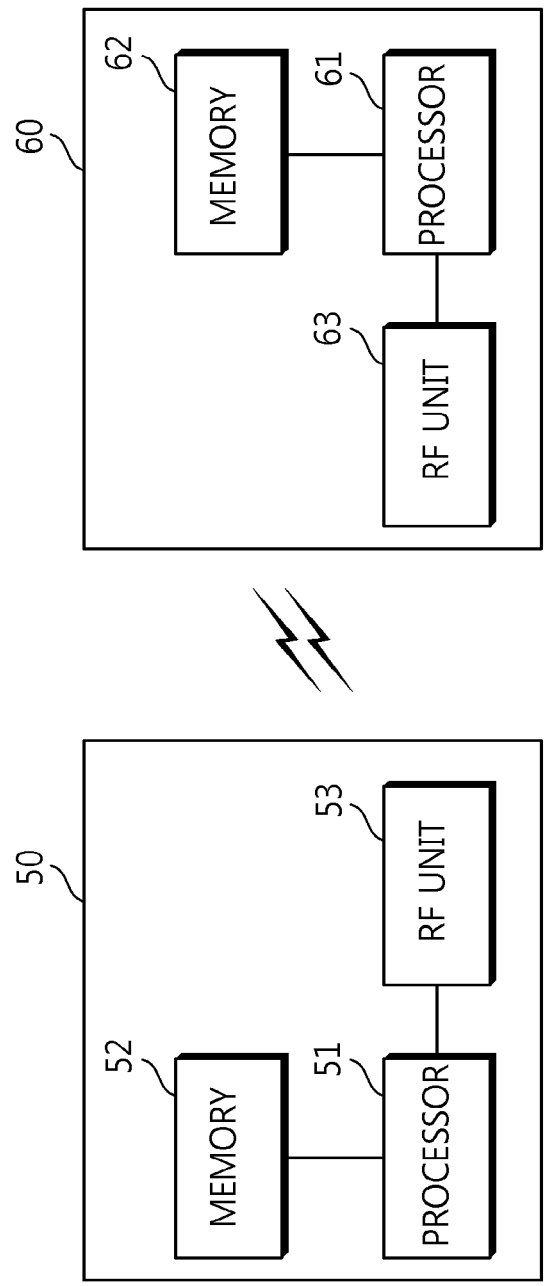
FIG. 10 is a block diagram showing a wireless communication system for implementing an embodiment of the present invention.

FIG. 10 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the embodiments of FIG. 7 to FIG. 9, the operation of the BS 50 can be implemented by the processor 51.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the embodiments of FIG. 7 to FIG. 9, the operation of the UE 60 can be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of managing a component carrier by a user equipment in a wireless communication system, the method comprising:
    receiving activation pattern information indicating activation or inactivation of at least one serving cell from a base station;
    activating or inactivating the at least one component carrier according to the activation pattern information, the activation pattern information including an activation pattern indicating activation or inactivation of the at least one component carrier on a subframe basis, the activation pattern information further including a period of the activation pattern and at least one serving cell identifier indicating the at least one serving cell to which the activation pattern is applied, the activation pattern information being periodically applied such that a signaling overhead for activating or inactivating the at least one component carrier can be minimized, the activation pattern being expressed as a subframe-based bitmap, a size of the subframe-based bitmap being equal to the period of the activation pattern;
    receiving an activation condition from the base station, the activation condition including: a threshold value related to at least one of a quality of a downlink channel, a buffer status of the user equipment, a power headroom status of the user equipment, and a transmission count for a scheduling request signal, the activation condition further including at least one parameter for inactivating the at least one serving cell, the activation condition being received from the base station through a physical downlink control channel (PDCCH) message;
    autonomously determining whether the at least one serving cell should be inactive by using the threshold value included in the activation condition, the determination being performed in a unit of a single subframe; and
    inactivating the at least one serving cell based on the at least one parameter included in the activation condition.

2. The method of claim 1, wherein:
the at least component carrier corresponds to one cell; and
the component carrier to be activated or inactivated corresponds to a cell to be activated or inactivated.

3. The method of claim 2, wherein:
the at least one cell is at least one serving cell; and
the cell to be activated or inactivated may be a serving cell to be activated or inactivated.

* * * * *